May 23, 1961  L. A. WILSON  2,985,271
CLUTCH
Filed Dec. 27, 1957  3 Sheets-Sheet 1

INVENTOR
Lawrence A. Wilson
BY Sughrue & Rothwell
ATTORNEYS

May 23, 1961  L. A. WILSON  2,985,271
CLUTCH
Filed Dec. 27, 1957  3 Sheets-Sheet 2

INVENTOR.
Lawrence A. Wilson
BY
Sughrue & Rothwell
ATTORNEYS

May 23, 1961 L. A. WILSON 2,985,271
CLUTCH
Filed Dec. 27, 1957

INVENTOR
*Lawrence A. Wilson*
BY *Sughrue & Rothwell*
ATTORNEYS

United States Patent Office

2,985,271
Patented May 23, 1961

---

1

2,985,271
CLUTCH

Lawrence A. Wilson, Apalachin, N.Y., assignor to International Business Machines Corporation, New York, N.Y., a corporation of New York Filed Dec. 27, 1957, Ser. No. 705,595

8 Claims. (Cl. 192—33)

This invention relates to improvements in clutches and more specifically relates to a positive engaging clutch of the electromagnetic actuated type having novel cushioning means for the driving member, driven member and actuator and novel controlling means for the clutch. This clutch is especially useful on high-speed IBM card equipment and other similar devices.

Although the present invention is adapted for, and is partially described in relation to its application with, a high-speed card feeding or handling device, it is not to be construed as limited to such an application as it can be advantageously utilized in various other types of apparatus where it is desired to have the features which this invention provides.

In clutches for use in high-speed IBM card equipment, for example, card readers, it is necessary that the clutch have a positive engagement and be adapted to start and stop the clutched or driven parts at a rapid rate. This rapid rate requires a comparatively high-speed driving shaft and, due to the positive engagement at this relatively high-speed drive, shocks and repetitive stresses are set up in the component parts of the clutch and its actuator. This invention provides means for minimizing the shocks and the consequent harmful effects, in addition to providing a novel actuator assembly and control means for the clutch.

An object of this invention is to provide a high-speed positive-engaging type clutch having a flexible coupling or similar cushioning means between the input and output with a positive-engaging clutching device interposed therebetween. It is a further object of this invention to provide an electromagnetic actuator assembly for actuating the clutch by forcing the positively engaging elements out of engagement and holding them out of engagement until the control is released. It is an additional object of this invention to further cushion the actuator assembly by supporting it with rubber mounts.

With these and other objects in view the invention utilizes a driving member including a two-position stop member and a resilient coupling in the drive. This stop member has abutments which are adapted to cooperate with spring-biased pivoted dogs carried by a driven assembly. Another resilient flexible coupling is included in the driven assembly. A control member carried by the driven assembly but movable with respect thereto is provided for disengaging the dogs. The clutch is controlled by an actuator assembly of the electromagnetic type and this assembly is supported by rubber mounts. More specifically, the actuator assembly includes a stop finger which is moved into the path of the driven assembly to stop the same while allowing the control member to advance by its inertia to disengage the pawls from their cooperating abutments. A latching finger of the actuator assembly holds the control member in this position to assure that the clutch is disengaged until such time as the actuator assembly moves the fingers to their nonintercepting position, thereby allowing the spring biased dogs to engage the abutments and provide a positive driving connection.

Other objects, advantages and features of this invention will be apparent from the following detailed description taken in connection with the accompanying drawings wherein.

Figure 1:
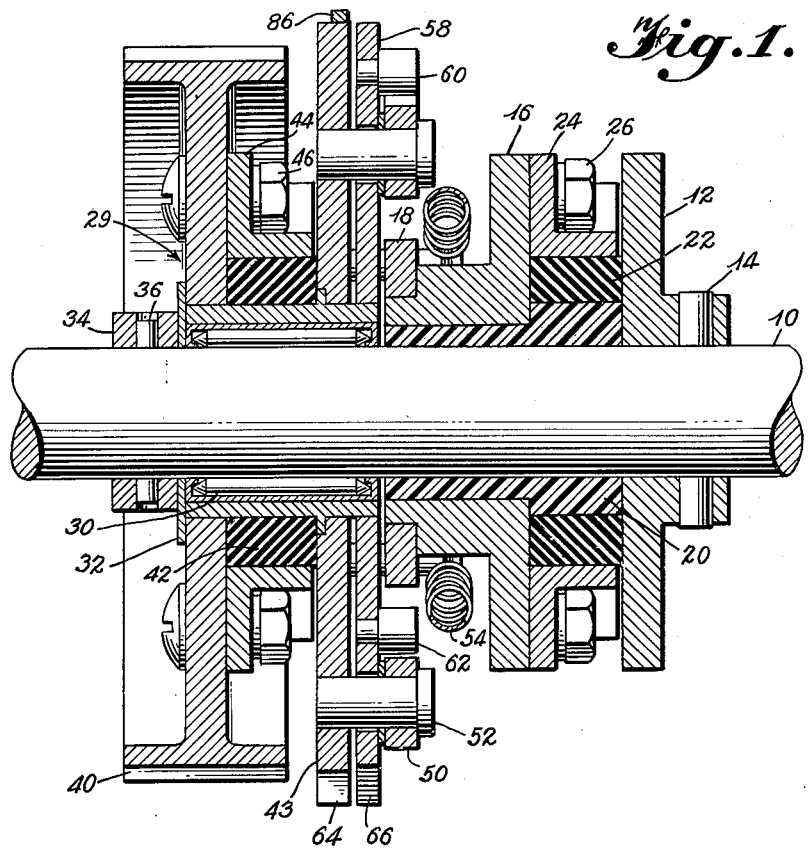
Fig. 1 is a side sectional view showing the preferred embodiment of the clutch of this invention.
Figure 2:
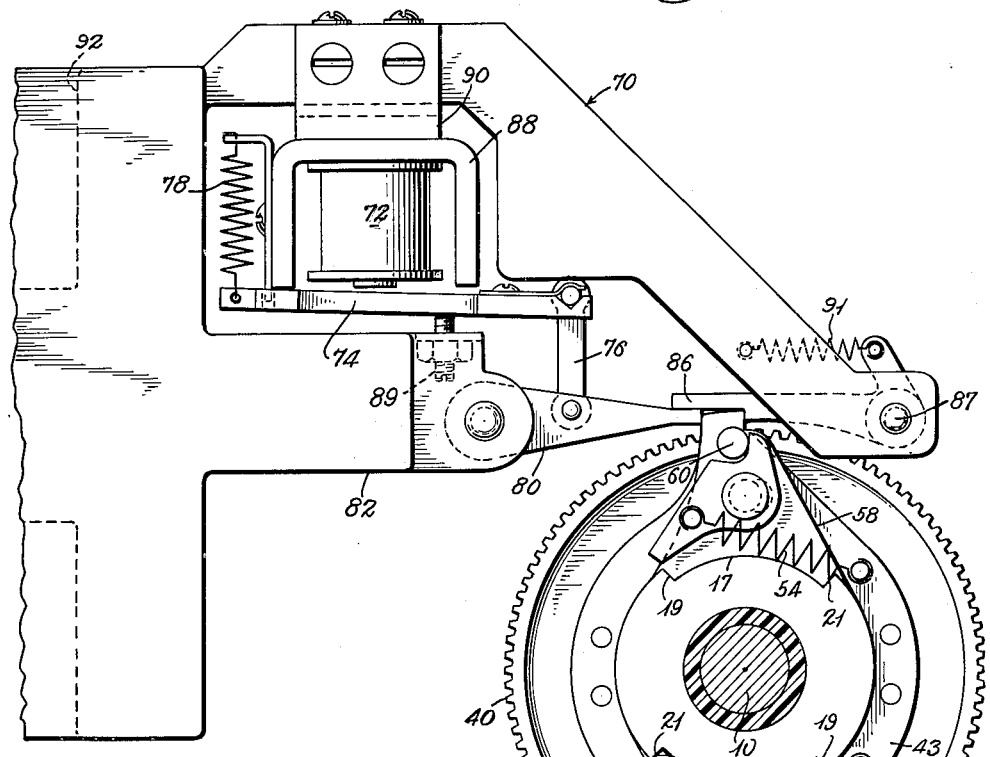
Fig. 2 is an end view partly in section showing the actuator mechanism and the clutch in the disengaged position.

Referring to Fig. 1, a central clutch shaft 10 may be continuously driven and functions as the drive input to the clutch. This shaft is rigidly connected to a disc member 12 by a suitable means such as a pin 14. A flanged disc 16 carries a ratchet or stop member 18 and this flanged disc is secured to a plastic bushing 20. In the preferred embodiment, the stop member has two arcuate sector cut outs 17 providing two pairs of abutments 19, 19 and 21, 21, each correspondingly numbered pair of abutments being substantially 180° apart, as shown in Fig. 2.

A flexible drive connection or coupling 22, which may be made of resilient material such as rubber, is interposed between the driving disc 12 and the flanged disc 16. This flexible connection is shown more particularly in Fig. 4 wherein spidered coupling 22 has radial, outwardly extending arms 23. Discs 12 and 16 are connected to opposite faces of coupling 22 by segmental members 24 positioned between the arms 23. These segmental members 24 are secured to the adjacent faces of discs 12 and 16 by suitable screw means 26. Any movement of one disc which is not simultaneously followed by the same movement of the other disc will compress the rubber fingers of the coupling 22, thereby providing a resilient or cushioned rotary drive.

The driven assembly 29 of the clutch is rotatably supported on the central shaft 10 by means of a suitable roller or needle bearing 30. A seal 32 is provided for the bearing, and this seal, as well as the other rotative parts, are held in axial position by a collar 34 rigidly secured to the shaft 10 by a pin 36.

The driven assembly includes an output member 40, such as a pulley for a timing belt, and this pulley is connected through a flexible coupling 42 to a plate member 43. This flexible connection is similar in construction and function to the flexible connection 22 and is similarly secured to the adjacent members 40 and 43 by segmental sections 44 and screw and nut means 46.

A drive dog 50 and a keeper dog 51, both of which pivot about stub shafts 52 carried by the plate member 43, are biased by springs 54 to a position of contact with the stop member 18. These dogs engage adjacent abutments 19 and 21 with the ends of the dogs facing each other in a scissors-like manner which will provide a positive drive.

A control member 58 is positioned adjacent plate member 42 and carried by the driven assembly but is rotatably movable relative thereto. This movement is limited by the length of slots 59 which allow the stub shafts 52 to pass through the control member. The control member has control pins 60 and 62 thereon for the purpose of moving the dogs 50 and 51 out of engagement with the abutments 19 and 21 of the stop member 18 to disengage the clutch. Plate 43 and control member 58 have a pair of projections 64, 64 and 66, 66, respectively, for the purpose of controlling the clutch, and the projections of each pair are spaced substantially 180° apart in the preferred embodiment.

Figure 3:
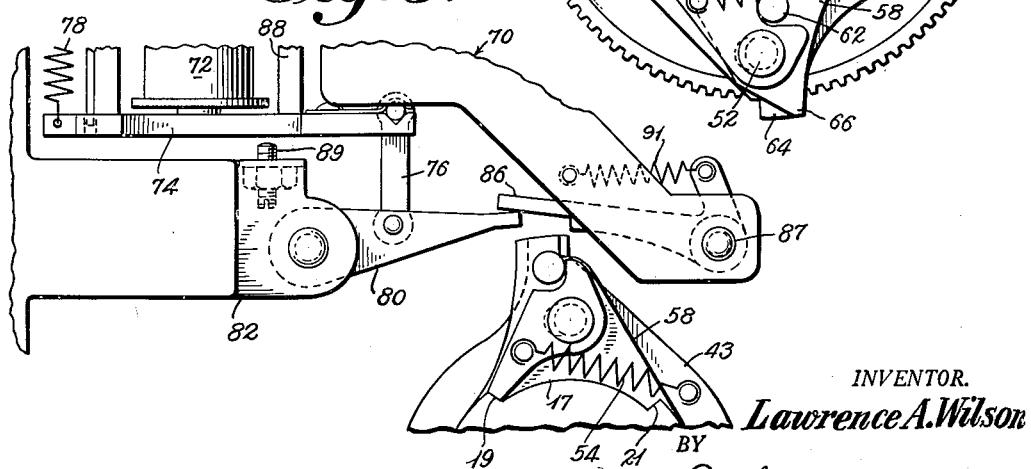
Fig. 3 is an end view similar to a portion of Fig. 3, but showing the clutch in its engaged position.
Figure 6:
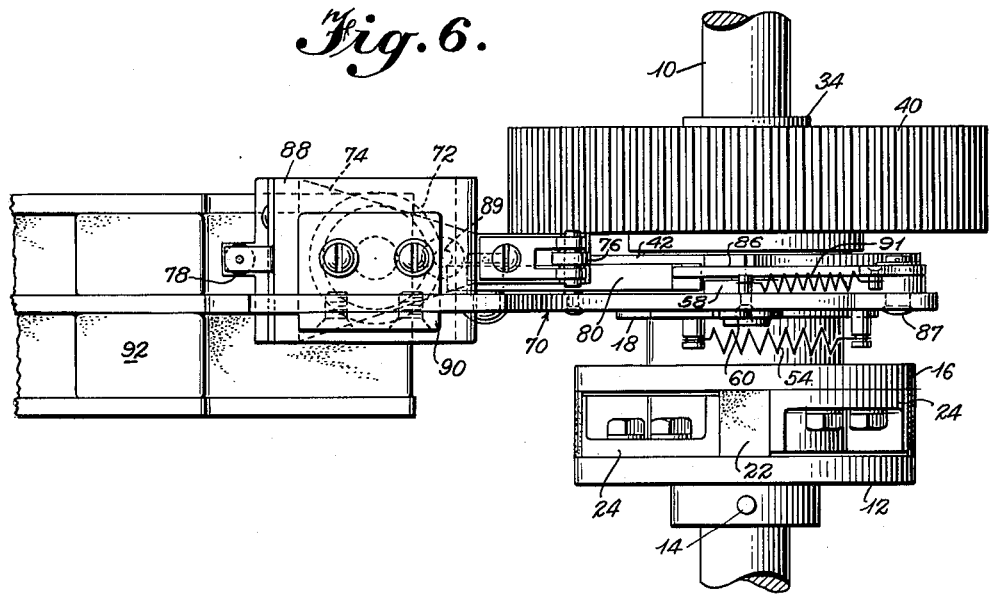
Fig. 6 is a top plan view of the clutch and actuator assembly.

An actuator assembly 70 is provided for controlling the operation of the clutch by controlling the engagement and disengagement of the dogs 50 and 51 with the abutments 19, 19 and 21, 21. As best shown in Figs. 2 and 3, this actuator assembly comprises an electromagnet 72 adapted to act upon a movable armature 74 which is effectively pivoted at 75 and is also pivotally connected to a vertical link 76. An armature spring 78 is provided to bias the armature 74 away from the position it takes when the electromagnet 72 is energized. A latch finger 80 is pivotally attached to a supporting assembly 82 and this latch finger is also pivotally connected to the vertical link 76. A stop finger 86 is pivotally secured to the support assembly 82 and this stop finger is biased to its intercepting position by a stop finger spring 91. The fingers 80 and 86 overlap, as shown in Figs. 2 and 6, and movement of latch finger 80 upwardly will likewise move stop finger 86 upwardly. Conversely, movement of latch finger 80 downwardly under the force of spring 78 when electromagnet 72 is de-energized will allow spring 90 to move stop finger 86 downwardly. The electromagnet 72 is supported by a U-shaped yoke 88 and this yoke in turn is secured to the support assembly 82 by a suitable bracket 90. The support assembly 82 includes a resilient shock absorbing mounting 92 so that the forces incurred when the clutch is actuated will be absorbed partially by this mounting. An adjustable screw and nut type stop device 89 may be provided for establishing the extreme lower or intercepting position of the fingers 80 and 86.

The latch and stop fingers 80 and 86 of the actuator assembly 70 are positioned adjacent the periphery of the control member 58 and the plate member 43 for the purpose of selectively cooperating with the projections 66, 66 and 64, 64 thereon, and thereby causing the control and plate members to move rotatively with respect to each other to actuate the clutch.

In operation, the shaft 10 is driven at any desired rate and this in turn rotates the stop member 18 at the same rate. The springs 54 bias the pivoted dogs 50 and 51 against the stop member 18 so that the dogs engage adjacent abutments 19 and 21 to positively drive the driven assembly 29. In the engaged position with the dogs cooperating with the abutments, the actuating assembly 70 is disengaged, that is, the electromagnet 72 is energized and it pulls the latching and stopping fingers 80 and 86 to a nonintercepting position so that they will clear the projections 64, 64 and 66, 66 on the peripheries of the plate member 43 and the control member 58, respectively.

When it is desired to declutch the driven assembly, the electromagnet 72 is de-energized and the action of spring 78 causes armature 74 to push down latching finger 80, thereby allowing the spring 91 to pull the stop finger 86 to its downward position, as shown in Fig. 3, to engage one of the peripheral projections 64, 64 on the driven plate member 43. This will stop the driven plate member 43, but the control member 58 will continue to rotate a small amount with respect thereto due to its inertia. This further rotational movement of the control member 58 will cause the pins 60 and 62 to act against the pivoted dogs 50 and 51 and move them out of engagement with the abutments 19 and 21 in the stop member 18, thereby disengaging the clutch. As the control plate 58 moves to this disengaging position, the latching finger 80 will move downward behind one of the projections 66, 66 on the control member 58 and latch this member in the position of disengagement; thus, the clutch will stay disengaged as long as the solenoid 72 is de-energized.

The shock imparted to the clutch, as it is engaged or disengaged, will be partially absorbed by the input and output flexible couplings 22 and 42 as well as by the resilient mounting 92 for the operator assembly 70.

Figures 4, 5:
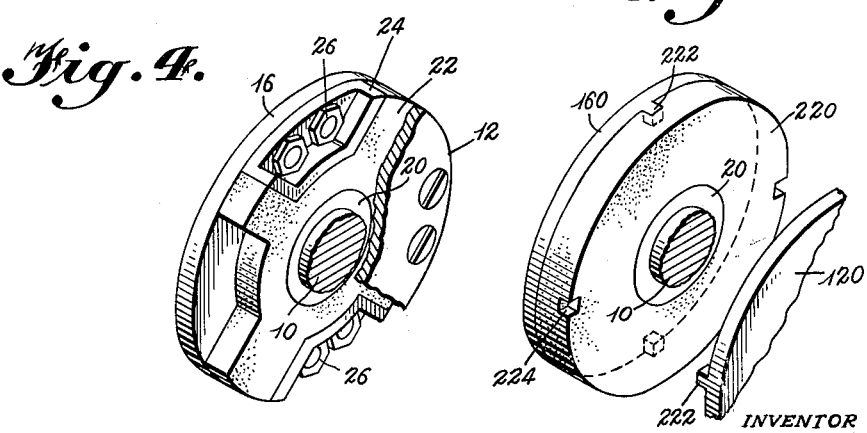
Fig. 4 is a perspective view partly in section of one type of flexible coupling which may be utilized in the input and output of this clutch.
Fig. 5 is a perspective view partly in section of an alternative form of flexible coupling.

An alternative form of flexible coupling for absorbing the engagement shocks is shown in Fig. 5. A molded rubber insert 220 is bonded to the inner faces of adjacent discs 160 and 120. These discs correspond to discs 16 and 12 shown in Fig. 1. Each disc has a pair of oppositely disposed protuberances 222 thereon and these protuberances fit in pockets 224 of the molded rubber disc 220. The disc and flexible coupling are all assembled on shaft 10 in similar relation to the corresponding parts shown in Fig. 1. In operation, the driving disc 120 is turned to cause disc 160 to follow. Any sudden shock or torque will be taken up by the rubber disc 220 bonded to each of the discs 160 and 120 and this strain on the disc 220 will be in shear.

Figure 7:
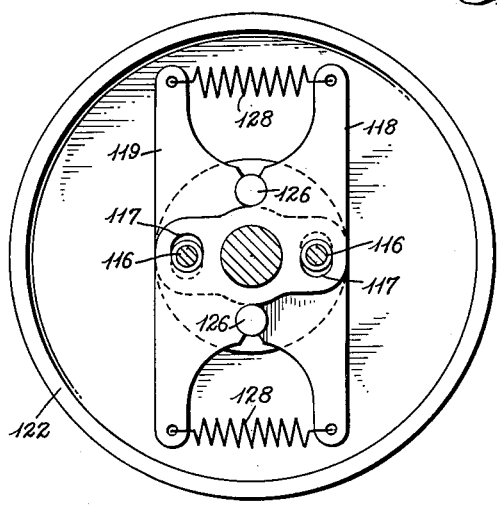
Fig. 7 is an end view of another alternative form of resilient flexible coupling.
Figure 8:
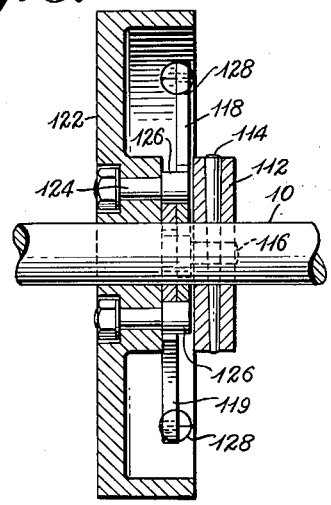
Fig. 8 is a side sectional view along lines 8—8 of Fig. 7.

A second alternative form of flexible coupling is shown in Figs. 7 and 8. In this embodiment of the flexible coupling, the driving shaft 10 carries a disc 112 secured thereto by a suitable pin 114. This disc carries drive pins 116 which are received in slots 117 in a pair of arms 118 and 119 mounted on shaft 10 for relative rotation with respect thereto. A driven member 122 is mounted for rotation relative to the shaft 10 and member 122 contains pins 124 having enlarged heads 126. These heads cooperate with the sides of the fingers 118 and 119. Springs 128 are provided to bias the fingers toward each other and to provide the resilient drive connection. If there is any relative movement between the input member 112 and the output member 122, one of the pins 116 will move against the edge of its corresponding slot 117 and tend to move the arm containing the slot. Since this arm is resiliently connected to the other arm, the other arm will follow and drive the pin 124 and output member 122 through the resilient connection.

It will be clear from the foregoing description that applicant has disclosed a novel but specific embodiment of a clutch assembly and control therefor. This specific form or embodiment, as applied to the disclosure, was solely for the purposes of illustration and it is understood that the invention is not limited to the disclosed embodiment or its use in a card machine. The disclosed invention may be utilized in various manners as will be apparent to those skilled in the art to which the invention pertains, therefore, it is not considered limited by the specific disclosure but only by the spirit and scope of the appended claims wherein applicant is entitled to a reasonable range of equivalents.

What is claimed is:

1. A clutch assembly comprising in combination: driving means including an angularly flexible coupling interposed in its drive; driven means including another angularly flexible coupling interposed in its drive; positively engaging clutching means including a pawl clutching member and a ratchet clutching member, said clutching means being interposed between said driving and driven means, one of said clutching members being carried by said driving means and the other of said clutching members being carried by said driven means; and a control member carried by said driven means and adapted to rotate in relation thereto to operate said clutching means.

2. A device as defined in claim 1 further comprising: an actuator assembly, said assembly having electromagnetically operated means adapted to selectively engage said driven means and allow said control member to move with respect to said driven means and thereby operate said clutching means.

3. A device as defined in claim 2 further comprising: a resilient shock absorbing supporting mount for said actuator assembly.

4. A clutch comprising in combination: a rotary driving member, a flexible coupling connected to the output side of said driving member; a ratchet-like stop member attached to the output side of said flexible coupling; pawl means adapted to cooperate with said stop member; an output plate pivotally supporting said pawl means; spring means biasing said pawl means against said stop member; a control member positioned adjacent said output member and having means thereon for disengaging said pawl means from said stop member; a second flexible coupling connected to the output side of said output plate; both of said flexible couplings being resilient only angularly with respect to their connected members, a rotary driven member connected to the output side of said second flexible coupling; an electromagnetic actuator assembly for stopping said output plate to cause said control member to move by its inertia to disengage said pawls and for latching said control member in position where the pawls are disengaged; and solid resilient shock absorbing means supporting said actuator assembly.

5. A clutch comprising: a driving shaft, a first flange secured to said shaft; another flange disposed on said shaft adjacent said first flange; a resilient flexible coupling interposed between, and resiliently connecting, said flanges; a stop member having two pairs of abutments thereon, said stop member being carried by said second flange; a driven member mounted for free rotation on said shaft; a plate member on said shaft adjacent said driven gear, said plate member also being mounted for free rotation with respect to said shaft; a resilient flexible coupling interposed between, and resiliently connecting, said plate member and said driven gear; a pair of pivoted dogs carried by said plate member, said dogs being adapted to engage one pair of the abutments on said stop member in a scissors-like manner; springs biasing said dogs into a position of engagement with said abutments; a control member disposed about said shaft adjacent said plate member and on the opposite side thereof from said driven gear, said control member being free to rotate with respect to said shaft and said driven gear; pins mounted on said control member, said pins being adapted to contact said dogs when said control member is rotated to a predetermined position with respect to said plate member to disengage said dogs from said abutments and therefore disengage said clutch.

6. A device as defined in claim 5 wherein said plate member and control member each has radial, outwardly extending projections on its periphery and further comprising: a support member; a stop finger pivotally connected to said support and adapted to be selectively movable into or out of the path of the projection on said plate member; means biasing said finger to an intercepting position; a latch finger pivotally connected to said support and adapted to be selectively movable into or out of the path of the projection on said control member to prevent rotation of said control member in a direction opposite the rotation of said plate member; said latch and stop fingers overlapping whereby movement of said stop finger to its intercepting position will allow said latch finger to move to its intercepting position and movement of said latch finger to its nonintercepting position will cause said stop finger to move to its nonintercepting position; an electromagnet secured to said support and having an armature connected to said latch finger for moving the same; and a resilient shock absorbing mounting for said support.

7. A clutch comprising in combination: a rotary driving member and a rotary driven member; a resilient flexible coupling device attached to each of said members in a fixed axial position, said coupling devices being flexible only angularly with respect to the driving and driven members; a positively engaging biased dog and stop type detent connecting the driving and driven members through both of the flexible couplings; a control plate rotatably mounted with respect to the driven member for controlling the detent; an electromagnetic operator adapted to cooperate with the control plate for causing the control plate to rotate with respect to the driven member; and a solid resilient support for the electromagnetic operator.

8. A clutch control mechanism for a card feeding device or the like comprising: a rotary driving device including a resilient coupling; a rotary driven device also including a resilient coupling, said resilient couplings being attached to the driving device and the driven device in fixed axial positions and being only angularly flexible; a clutch device interposed between said resilient couplings for interconnecting said driving device to said driven device, said clutch device being the positive engaging dog and stop type; a control member adjacent said clutch device for actuating the same; an electromagnetic actuator assembly having means for causing the control member to actuate said clutch device, and a solid resilient shock-absorbing support mounting said electromagnetic actuator assembly.

References Cited in the file of this patent

UNITED STATES PATENTS

| 1,151,803 | Kuntzler | Aug. 31, 1915 |
|---|---|---|
| 1,258,115 | Henderson | Mar. 5, 1918 |
| 1,387,017 | Smith | Aug. 9, 1921 |
| 2,005,974 | Hutchison, | June 25, 1935 |
| 2,089,846 | Finch | Aug. 10, 1937 |
| 2,174,168 | Rattray | Sept. 26, 1939 |
| 2,186,100 | Doering | Jan. 9, 1940 |
| 2,658,599 | Luhn | Nov. 10, 1953 |
| 2,830,445 | Kressin | Apr. 15, 1958 |